(12) United States Patent
Hutchinson et al.

(10) Patent No.: US 7,494,678 B2
(45) Date of Patent: Feb. 24, 2009

(54) METHOD AND APPARATUS FOR PRODUCING A DOUGHNUT

(75) Inventors: Jeffrey Hutchinson, London (GB); Kevin Rogers, London (GB)

(73) Assignee: Donuts and Company Limited, London (GB)

( * ) Notice: Subject to any disclaimer, the term of this patent is extended or adjusted under 35 U.S.C. 154(b) by 825 days.

(21) Appl. No.: 10/624,062

(22) Filed: Jul. 21, 2003

(65) Prior Publication Data

US 2004/0096545 A1 May 20, 2004

Related U.S. Application Data

(63) Continuation-in-part of application No. 09/734,094, filed on Dec. 11, 2000, now abandoned.

(30) Foreign Application Priority Data

Mar. 7, 2000 (GB) ................................ 0005340.5

(51) Int. Cl.
*A21D 13/00* (2006.01)
(52) U.S. Cl. ........................ 426/94; 426/99; 426/293; 426/296; 426/302; 426/303; 426/496; 426/497
(58) Field of Classification Search ............... 426/94, 426/99, 302, 293, 296, 496, 497
See application file for complete search history.

(56) References Cited

U.S. PATENT DOCUMENTS

| 4,068,009 A | 1/1978 | Rispoli et al. |
| 4,175,483 A | 11/1979 | Clark |
| 4,293,572 A | 10/1981 | Silva et al. |
| 5,028,442 A | 7/1991 | Zemelman et al. |
| 5,130,150 A | 7/1992 | Averbach |
| 5,804,243 A | 9/1998 | Loh et al. |

FOREIGN PATENT DOCUMENTS

| GB | 2 015 315 A | 9/1979 |
| JP | 59055140 | 3/1984 |
| JP | 03-127941 | 5/1991 |
| WO | 93/24040 | 12/1993 |
| WO | 98/30105 | 7/1998 |

OTHER PUBLICATIONS

C.E. Morris, "Low-fat fried foods at 40% less energy cost," Food Engineering, vol. 53, No. 11, pp. 146-147.

*Primary Examiner*—Lien Tran
(74) *Attorney, Agent, or Firm*—RatnerPrestia

(57) ABSTRACT

A method and apparatus for preparing yeast raised doughnuts without frying is disclosed. A proven dough mixture is coated with a cooking fat, such as vegetable shortening, before baking and, subsequently coated with cooking fat again after baking so that the resultant product does not consist of a bread-like substance.

20 Claims, 2 Drawing Sheets

METHOD AND APPARATUS FOR PRODUCING A DOUGHNUT

CROSS REFERENCE TO RELATED APPLICATIONS

This application is a Continuation in Part of U.S. patent application Ser. No. 09/734,094, filed Dec. 11, 2000 Now Abandon, which claims priority of GB 0005340.5, filed Mar. 7, 2000, both of which are incorporated in their entirety herein by reference.

FIELD OF THE INVENTION

The invention relates to a new process and apparatus for preparing a doughnut. In particular, the invention relates to a method of making a yeast-raised doughnut.

BACKGROUND OF THE INVENTION

There are two general types of doughnut, cake doughnuts made from a mix with baking powder which produce a heavy dense product, and yeast raised doughnuts which are lighter and more spongy. Cake doughnuts are generally ring doughnuts, do not contain yeast and are not prooved during the manufacturing process; yeast raised doughnuts, on the other hand, are proofed, have a different texture, and are fluffier and lighter. Yeast raised doughnuts may be both ring type with icing, or shell type containing a filling.

Presently, yeast raised doughnuts are made by frying. The process illustrated in FIG. 1, generally comprises the following steps:
1. Mixing a dough mixture—containing, for example, wheat flour, dextrose, vegetable oil, salt, raising agents, emulsifiers, defatted Soya flour, whey powder, milk protein, skimmed milk powder, stabilizers, flavourings, colour and flour treatment agents—with yeast and water;
2. dividing into equal portions and allowing to ferment for up to 45 minutes during which time the dough rises to typically double in size;
3. kneading the dough either by machine or by hand so as to remove excess air, sheeting and shrinking the dough; and
4. cutting the dough into doughnut shapes.
5. The doughnut shapes are next transferred to a prooving room where heat and humidity are added for up to 45 minutes; in this specification a reference to 'proving' is to the addition of heat and humidity. A reference to a proven product shall be interpreted accordingly.
6. The doughnuts, now double in size are allowed to stand for up to 15 minutes creating a skin on the external surface of the doughnut.
7. The doughnuts are then fried for about 1.5 minutes or less in shortening at about 185° F.; and
8. after cooling the doughnuts are filled or iced or both.

Recently, as the public became more aware of the deleterious effect of fat in foods there has been an effort by the food industry to reduce the amount of fat in consumable products and a growing demand for healthier foods of all sorts including low fat equivalents of high fat foods. Doughnuts, in common with most fried foods, are seen as being high in fat and not suitable for a healthy diet. One way to avoid the high fat content of fried doughnuts is of course to avoid deep frying the dough and instead of frying, bake the doughnut.

A baked doughnut, however, would be expected by the skilled artisan to exhibit a bread-like texture lacking the external crispness and typical doughnut taste of the yeast raised deep fried doughnut.

In JP-A-3-127941, there is disclosed a method of manufacturing foodstuffs by baking while giving a flavour of fats or oils, i.e. a fried taste. The Japanese document discloses mixing a dough mixture of flour, yeast, sugar, eggs and seasoning with water; injecting the mixture in an automatic injector to form doughnut rings which are soft and deformable; pretreating the rings at 100° C. on a net conveyor in an oven; spraying hot fat at 180° C. and baking at 190° C. Significantly, according to the disclosure, when a similar dough mixture was fried it did not survive the frying process. This reference does not disclose a process for making a raised yeast doughnut using a proven dough mixture but rather a very heavy, dense cake type doughnut product. Obviously the dough used is different from the standard yeast raised doughnut dough used by the industry to prepare fried doughnuts, because, as the patent indicates, this dough could not be fried.

GB 2015315 discloses a new moisture barrier applied to a fried doughnut.

WO-A-98/30105 discloses a glaze applied to a dough product which is to be frozen and in particular, a pizza. The glaze is applied to the dough product which is to be baked before freezing. The glaze consists of water, oil and a hydrophilic colloid. While this patent mentions doughnuts it provides no details with regard to a process for making a doughnut. In particular, there is no disclosure of a yeast raised doughnut. Instead it is clear that the process is generally applicable to bread based products. The skilled artisan would understand that the disclosed process which does not include a proving step, produces a product with a bread like texture rather than a yeast raised doughnut. There is no disclosure of a proven dough mixture coated with fat and then baked to produce a doughnut.

In view of the current trends to reduce the amount of fat in food products there is, therefore, still a need for a process that produces a raised yeast doughnut which maintains the texture and taste of a yeast raised fried doughnut with significant less fat content than the fried doughnut.

SUMMARY OF THE INVENTION

The present invention provides a method of making a yeast raised doughnut which does not require a frying step in its manufacture but which has the taste, flavour and texture of a fried yeast raised doughnut while having reduced fat content when compared to a fried doughnut. The method according to this invention comprises the steps of:
(a) forming a proven dough mixture;
(b) applying a first coating comprising a first cooking fat to said proven dough mixture;
(c) baking said coated proven dough mixture to form a baked proven dough mixture; and
(d) applying a second coating comprising a second cooking fat to said baked proven dough mixture to form said yeast raised doughnut.

The applying step is desirably performed by spraying the dough both before and after baking with the cooking fat. Preferably, the process contemplates at least one of said first coating and said second coating as consisting essentially of a cooking fat or a combination of cooking fats.

Desirable cooking fats are soya, palm oil, rapeseed oil or combinations of these, and they are sprayed in a heated state. The second fat is preferably applied within three minutes following the dough exit from the baking oven.

DETAILED DESCRIPTION OF THE INVENTION

The invention will next be described in more detail by way of illustration only with reference to the accompanying drawings, which are intended to be used for illustrative purposes and are not to scale and not intended to be an engineering drawing.

For simplicity of explanation for the purposes of describing this invention, unless otherwise stated, the process conditions and fat loadings given herein will refer to the preparation of a typical doughnut. Typically the dough prior to the application of fat whether by frying or under the process of the present invention will have an average weight of 42 gr. (which may vary by plus or minus 10%) per doughnut. Although this value will be used for purposes of explanation, it will be understood that larger or smaller doughnuts may be made according to the invention. The preparation of such larger or smaller doughnuts will require proportional modifications to any of the steps and quantities recited herein, according to methods and practices known to the skilled artisan. For example, the amounts of fat applied during either or both of the coating steps will typically be somewhat higher on a larger doughnut and less on a smaller one. In general, a doughnut prepared according to the invention, and prior to the application of any filler or icing weighs between about 45 grams and about 50 grams, typically about 48 grams.

Figure 2:
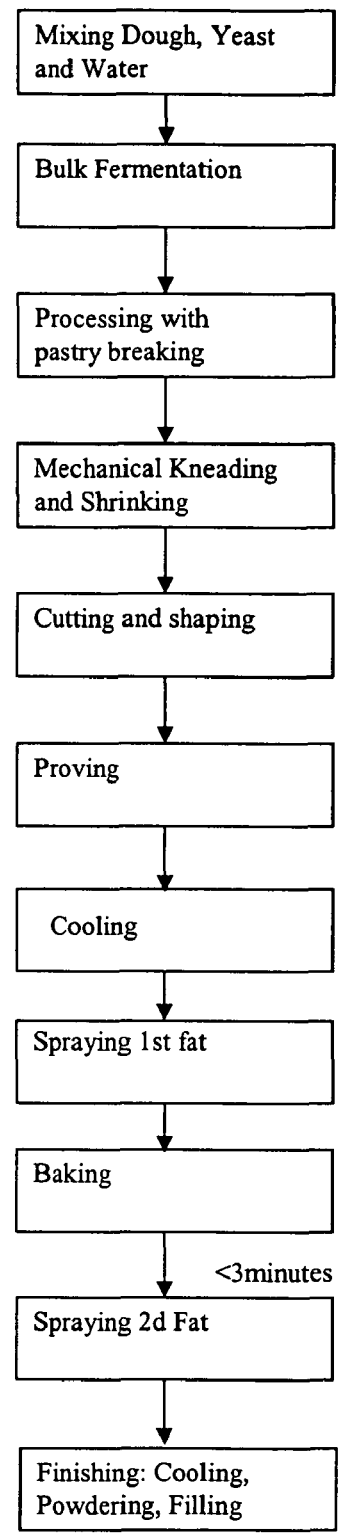
FIG. 2 is a flow chart showing the steps for producing a raised yeast doughnut in accordance with the present invention.

FIG. 2 illustrates the process steps for making a yeast raised doughnut in accordance with this invention. As described with respect to the making of yeast raised doughnuts by frying, a yeast raised dough mixture is also mixed with yeast and water in the current process. The proportion of water depends on the prevailing conditions, according to relationships known to those skilled in the art. The dough mixture again typically contains wheat flour, dextrose, vegetable oil, salt, raising agents, emulsifiers, defatted Soya flour, whey powder, milk protein, skimmed milk powder, stabilizers, flavourings, colour and flour treatment agents. In the mixing step the dough mixture is mixed with yeast and water. A spiral mixer is used for 2 minutes at a slow speed and 8 to 10 minutes at a high speed. The final dough temperature is typically 21-24° C. (70-75° F.).

After the mixing step the dough is left for a period of 30 to 40 minutes of bulk fermentation time during which time the dough rises, typically doubling in size. Once the dough has ripened, it is subjected to processing by a pastry break.

In the next process step, the dough is kneaded mechanically and then transferred to a first travelling table for shrinking where the tension is taken out of the dough to prevent shrinking of the product during subsequent processing. Then the dough is passed to a second travelling table (the cutting table) where the dough passes under a sharp roller for cutting into the required shape.

The shaped dough portions are then subjected to a proving step at 40-43° C. (105 to 110° F.) for 30 to 50 minutes with 55 to 60% relative humidity and left to cool for approximately 10 minutes. The proving step has the effect of increasing moisture content. This is followed by a cooling step.

The cooling step allows the surface of the dough to skin over and helps prevent excessive absorption of shortening.

The above steps are in accordance with a particular prior art process, known to the inventor, for making a yeast raised fried doughnut and may be varied in accordance with any such prior art process. Process conditions and times may be varied depending on the starting mixture or process equipment, for example, and such adjustments are well within the ability of a person of normal skill in the art.

The next step in the doughnut making process in accordance with this invention, is not a deep frying step. In the next step, the cut and shaped doughnut dough portions are taken from the cold proof rack following the proving and cooling steps, and sprayed with a cooking fat. For an average cut and shaped dough portion weighing about 40-45 grams, approximately 2 to 2.5 gr. of cooking fat are applied at this stage to coat all sides of the proven dough.

As used herein, the term "cooking fat", unless otherwise specified, means any fat or oil known in the food preparation art, and includes as nonlimiting preferred examples soya, canola oil, rapeseed oil, safflower oil, corn oil, palm oil, or mixtures of these and/or other edible oils or fats, including fully and/or partially hydrogenated oils or fats.

Preferably what is applied to the dough at this stage consists essentially of cooking fat or a combination of cooking fats, and in any case, comprises at least 80 wt. % cooking fat. Small amounts of water may be present. As used herein, the term "consists essentially of cooking fat" as applied to a fat formulation indicates that the formulation consists only of fats or oils as described above in any common grade of purity. A solid vegetable shortening is preferable because it tends to produce a less greasy final product.

Figure 3:
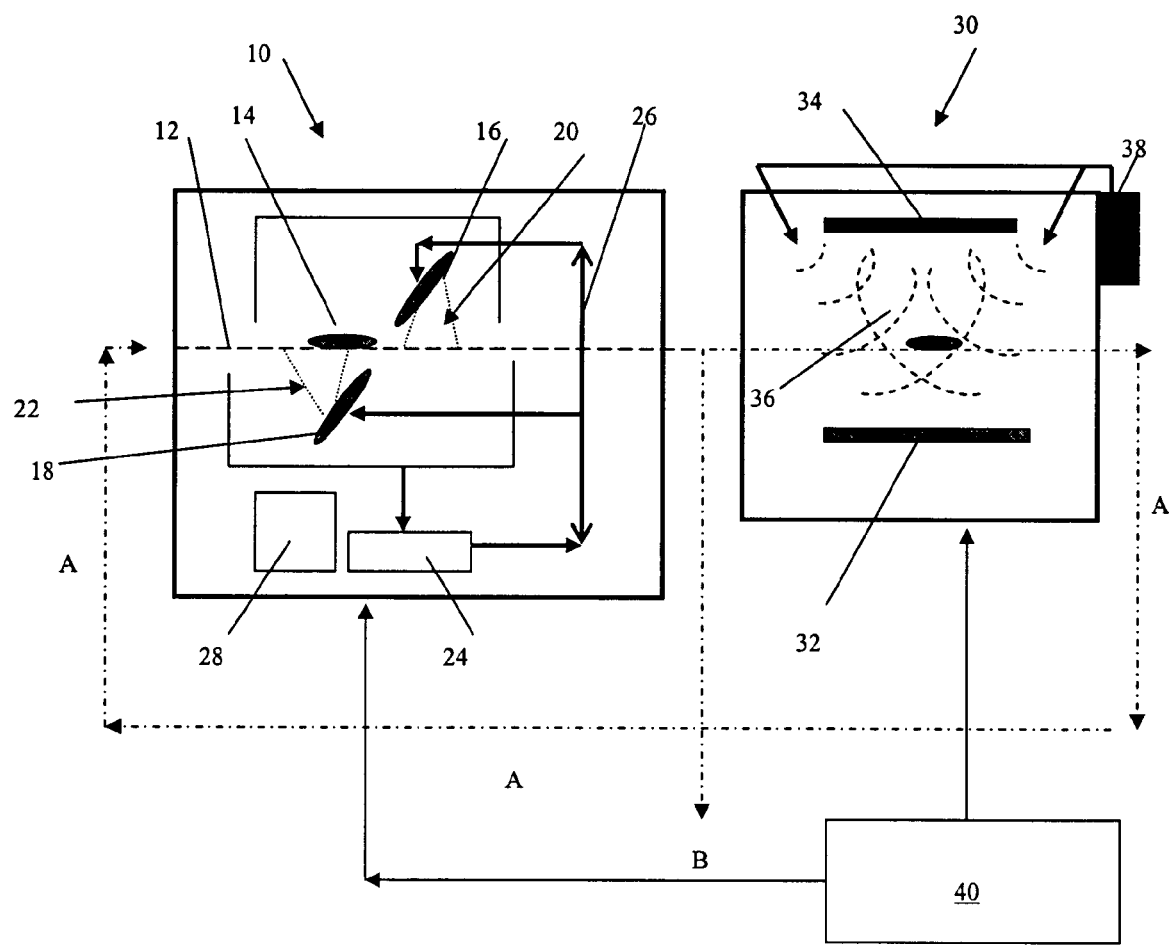
FIG. 3 is a schematic illustration representing one exemplary embodiment of apparatus used in the process according to the invention.

FIG. 3 schematically illustrates apparatus for the implementation of the fat spray and baking steps. A spraying machine 10 is used to apply the cooking fat coating to the proven dough. Such apparatus may comprise any apparatus capable of applying a reasonably uniform coating over substantially the full surface of the proven dough. As shown in FIG. 3, the apparatus may comprise a screen drive 12 adapted to transport doughnut dough 14 placed thereon through the apparatus and under a disk spray system 16 that applies a first spray of fat 20; a second disk spray system 18 applies a second fat spray 22 on the underside of the doughnut dough 14 thus coating both sides of the dough. As shown the spray disks are connected to the fat recirculating system 26 which is used to spray fat from a heated fat storage tank 24 onto the dough 14. The apparatus preferably includes an electronic control 28 which is useful in controlling the speed of transport of the dough through the apparatus and the temperature and amount of sprayed fat.

Typically the spraying equipment will heat the fat (typically shortening) sufficiently only to melt it. The shortening should not be hot enough to initiate any cooking of the dough when sprayed on the dough. The temperature of the fat should be between about 100° C. and about 65° C. More preferably, the temperature is about 85° C.

Still referring to FIGS. 2 and 3, after the first application of fat, the next step is a baking step. The sprayed proven dough cut portions are transferred to a baking rack and to an oven 30 where they are baked. The baking temperature may be varied between about 210° C. and about 280° C., preferably about 225° C. to about 245° C., and more preferably 235° C.

Baking time may be varied in accordance with other factors such as the baking temperature, size of doughnut and other process conditions. The baking time may be from about 4 to about 9 minutes, most preferably between about 6.5 to about 7.5 minutes for the typical proven and cut dough portions size of between 40 and 45 gr. The baking parameters are selected such that the dough is properly cooked, browned and so that it retains sufficient moisture, as is understood by the skilled artisan.

While no particular oven is critical, it must as a minimum comprise besides heating elements 32 and 34 a temperature control (not illustrated). It is desirable to use an oven equipped with a steam system 38 and to apply steam 36 to the baking proven dough. The oven may be a continuous bake type where dough enters at one point and exits through another after travelling at the appropriate speed through the oven to provide a desired residence time (cooking time) or may be a batch type oven where a tray of sprayed dough is placed in the oven and removed. Using an oven of the first type permits to automate the manufacturing process to a certain degree by continuously feeding dough along path "A" shown in dotted lines. The process may be further automated by introducing a second spray machine following the oven in line therewith for continuous production. In the alternative where a batch oven is used baked dough may be brought back to the spray machine for a second pass and removed along path "B".

The amount of steam applied is empirically adjusted to prevent drying of the baking dough. Suitable exemplary ovens include those provided by Revent International of Sweden, such as the Revent Double Rack model 626 or 620. If desired, the oven may include controls that may be operator selected to perform the desired functions or the oven may operate under the control of a computer programmed to properly set the temperature, timing, steam application and airflow. Such control is useful in controlling the oven to supply 3 seconds of steam at the beginning of the first minute of baking followed by 1 second of steam at the beginning of each subsequent minute.

The sprayed and baked doughnut portions are removed from the oven and a second coating comprising cooking fat is sprayed onto the baked proven dough in a post baking step. In this step, the cooking fat is, usually but not necessarily, the same fat as was done in the first, pre-baking fat application step and usually the second spraying is performed by the same equipment used for the first spray. The post baking fat application step should be carried out while the dough is still warm, usually within 3 minutes of removal from the oven and preferably within 1 minute.

In the second fat application step, the proven sprayed and baked dough portions are again each coated with approximately 2 to 4 gr. of fat. The amount of fat coated in each of the pre-bake and post-bake spraying steps may be varied and may be different in each step. However, the total amount of fat coated should be less than 8 gr. and preferably between 4 and 5 gr. for the dough portions of between 40 and 45 gr.

After the second fat spraying step, the baked doughnuts are left on cold racks to cool and finished in the same manner as are the deep fried doughnuts of the prior art, by the application of icing and/or the injection of a filling substance and application of a coating of powdered sugar or similar substance. The various options for coating or filling doughnuts are well known to those skilled in the art.

The result is a doughnut which looks and tastes as good as, or better than, a fried doughnut. The texture of the baked doughnut is indistinguishable from the prior art fried yeast raised doughnut, but the fat content can be reduced from about 26.5 grams per hundred grams of pre-filled or iced doughnut, typical for a fried doughnut, to about 17.7 grams of fat per hundred grams of doughnut for a similar baked doughnut prepared in accordance with the present invention. Yet the product retains substantially the same texture and taste of the similarly prepared but fried raise yeast doughnut of the prior art even though it is a baked raised yeast doughnut.

The processing conditions are important to prevent the result being a bread-like product. The important processing steps, therefore, are the pre-coating, baking and post-coating steps, which have not previously been used in the production of a doughnut. The baked doughnuts according to this invention are believed to maintain the desirable texture and taste of the fried doughnuts as a result of the post baking coating of the doughnuts with a cooking fat. It is believed that such post baking coating serves to replenish the fat content of the previously coated surface of the dough, which has decreased due to the migration of fat from the first coating during the baking step, and thereby provides the desired surface texture and taste of the fried doughnut with a reduced amount of fat.

Although in the above example specific values have been recited for process conditions in some places, it is apparent that such conditions of times, temperatures, quantities etc. may be varied within reasonable limits by the skilled artisan as necessary, and it is within the capabilities of the skilled artisan to vary those conditions as necessary without using any inventive skill should adjustments need to be made, for example, for different dough quantities and mixtures.

COMPARATIVE EXAMPLE

Figure 1:
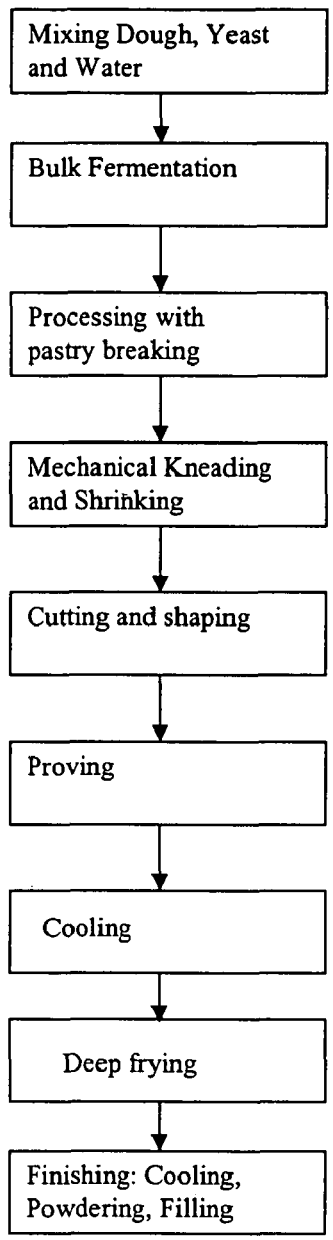
FIG. 1 is a flow chart showing the steps for producing a raised yeast product in accordance with the prior art.

A shell fried doughnut (That is a doughnut prior to the application of any filling or icing) was prepared in accordance with the steps of FIG. 1. The resulting doughnut weighed 62.2 grams, and contained 16.4 grams of fat (26.4 grams/100 grams of doughnut) as measured by the Werner Schmid method.

Using the same dough as used for the shell fried doughnut prepared above, a shell baked doughnut was prepared by substituting the process of this invention for the frying step, as shown in FIG. 2. The doughnut was sprayed coated with 2.5 gr. of fat in both the pre-bake and post bake steps. The resulting doughnut weighed 48.6 grams, contained 8.6 grams of fat (17.7 grams per 100 grams of doughnut) as measured by the Werner Schmid method. (It should be noted that the apparent discrepancy regarding the measured fat of 8.6 grams as compared to the applied 5 grams of fat, is due to the test conducted which measures total fat content of the doughnut. Total fat includes fat in the dough prior to the spray of frying steps and amounts to about between 3-4 grams of oil added to the dough during the dough making process, common to doughnuts produced by deep frying or by this invention.)

Thus, compared to the prior art doughnut, the doughnut of Example 1 had a 48% reduction in fat content. Texture and taste of both doughnuts was substantially the same.

Furthermore the reduction in overall weight to 48.6 grams for a doughnut produced in accordance with the present invention from the 62.4 grams for the same doughnut produced according to the prior art deep frying process is all attributable to fat reduction as the only difference between the production method used for the two samples is the present spray-bake-spray process verses the deep frying process.

Although the invention is illustrated and described herein with reference to specific embodiments, the invention is not intended to be limited to the details shown. Rather, various modifications may be made in the details within the scope and range of equivalents of the claims and without departing from the invention.

The invention claimed is:

1. A process of manufacturing a yeast raised doughnut, the process comprising the following steps performed in the sequence shown:

(a) forming a proven dough mixture;
(b) applying a first coating comprising a first cooking fat to said proven dough mixture;
(c) baking said coated proven dough mixture to form a baked proven dough mixture; and
(d) applying a second coating comprising a second cooking fat to said baked proven dough mixture while said baked proven dough mixture is still warm from said baking step to form said yeast raised doughnut;
wherein at least one of said first coating and said second coating consists essentially of a cooking fat or a combination of cooking fats.

2. The process according to claim 1 wherein said first and said second cooking fats consist essentially of a cooking fat or a combination of cooking fats.

3. The process according to claim 2 wherein said first and said second cooking fats are the same.

4. The process according to claim 1 wherein at least one of said first and said second coating comprises at least 80% by weight of a fat selected from the group consisting essentially of palm oil, rapeseed oil, soya or a combination thereof.

5. The process according to claim 1 wherein said first and said second cooking fats each comprise soya, palm oil, rapeseed oil, or a combination thereof.

6. The process of claim 1 wherein said first cooking fat is solid at room temperature and said step of applying a first coating to said proven dough mixture comprises heating and spraying said first cooking fat onto said proven dough mixture at a temperature sufficient to melt said first cooking fat and insufficient to initiate any cooking of the proven dough mixture.

7. The process according to claim 6 wherein said second cooking fat is also solid at room temperature and the step of applying a second coating onto said baked proven dough with said second cooking fat comprises heating and spraying said second cooking fat onto said baked proven dough.

8. The process according to claim 7 wherein the first cooking fat is the same as the second cooking fat.

9. The process according to claim 7 wherein said step of spraying said second cooking fat formulation onto said baked proven dough is performed within 3 minutes following the step of baking said proven dough.

10. The process according to claim 1 wherein at least one of said first and second fats consists essentially of a solid vegetable shortening.

11. The process according to claim 1 wherein the step of baking said coated proven dough further comprises applying steam to said proven dough.

12. The process according to claim 11 wherein said steam is applied for one second for every minute of baking.

13. A low fat baked yeast raised doughnut produced by:
(a) forming a proven dough mixture;
(b) applying a first coating consisting essentially of a first cooking fat to said proven dough mixture;
(c) baking said coated proven dough mixture to form a baked proven dough mixture; and
(d) applying a second coating consisting essentially of a second cooking fat to said baked proven dough mixture while said baked proven dough mixture is still warm from said baking step to form said low fat yeast raised doughnut.

14. The doughnut according to claim 13 wherein said first cooking fat is the same as the second cooking fat.

15. The doughnut according to claim 13 wherein said step of applying said second cooking fat onto said baked proven dough is performed by spraying said second cooking fat onto said baked proven dough within about 3 minutes following the step of baking said coated proven dough.

16. The doughnut according to claim 13 wherein said step of coating said second cooking fat onto said baked proven dough is performed by spraying said second cooking fat onto said baked proven dough within about 1 minute following the step of baking said coated proven dough.

17. The doughnut according to claim 13 wherein said at least one of said first and second fats consist essentially of a solid vegetable shortening.

18. The method according to claim 17 wherein said solid vegetable shortening is palm oil.

19. The doughnut according to claim 13 wherein the step of baking said coated proven dough comprises applying steam to said dough during at least a portion of said baking step.

20. The doughnut according to claim 19 wherein said steam is applied for one second for every minute of baking.

* * * * *